United States Patent [19]

Guichard

[11] Patent Number: 4,602,277

[45] Date of Patent: Jul. 22, 1986

[54] PERMANENT COLOR CORRECTION PROCESS USING A SAMPLING AND AN AVERAGE COLOR DETERMINATION AND A SYSTEM USING THIS PROCESS

[76] Inventor: Jacques Guichard, 8, rue des Morillons, 75015 Paris, France

[21] Appl. No.: 645,819

[22] PCT Filed: Dec. 28, 1983

[86] PCT No.: PCT/FR83/00264

§ 371 Date: Aug. 27, 1984

§ 102(e) Date: Aug. 27, 1984

[87] PCT Pub. No.: WO84/02822

PCT Pub. Date: Jul. 19, 1984

[30] Foreign Application Priority Data

Dec. 30, 1982 [FR] France ............... 82 22102

[51] Int. Cl.$^4$ ............... H04N 9/73; H04N 9/68
[52] U.S. Cl. ............... 358/29; 358/27
[58] Field of Search ............... 358/29, 27

[56] References Cited

U.S. PATENT DOCUMENTS

| | | | |
|---|---|---|---|
| 3,684,825 | 8/1972 | Dischert et al. | 358/27 |
| 3,737,561 | 6/1973 | Boer | 358/27 |
| 4,152,720 | 5/1979 | Fenton | 358/27 |
| 4,335,397 | 6/1982 | Tamura | 358/29 |
| 4,368,482 | 1/1983 | Machida et al. | 358/29 |

*Primary Examiner*—John W. Shepperd
*Attorney, Agent, or Firm*—Oblon, Fisher, Spivak, McClelland & Maier

[57] ABSTRACT

A color correction process applicable to video photography and a system using this process. A digital processing member receives image sample signals from a camera and calculates the average color of the images and determines therefrom correction coefficients which are applied to to the camera outputs. The coefficients can be based on average luminance, a reference color, or the saturation of the average color. The samples are continuously updated.

22 Claims, 10 Drawing Figures

PERMANENT COLOR CORRECTION PROCESS USING A SAMPLING AND AN AVERAGE COLOR DETERMINATION AND A SYSTEM USING THIS PROCESS

The present invention relates to a colour correction process and to a system using said process. It is more particularly used in general public video photography, in colour visiophony (the transmission of the image of the speaker at the other end of a telephone conversation, also known as picture phone) and more generally in the processing of colour images and pictures.

Photographic correction processes are already known and particularly white adjusting processes appropriate for television cameras. The document FR-A-2464611 describes a procedure in which a completely white screen (or a screen having colours in a balanced state, i.e. with an equal signal white) is placed in front of the camera to be corrected. This screen is photographed and the camera circuits are corrected in such a way that the electrical colour signals which it produces effectively correspond to white.

To carry out this correction, the average colour perceived by the camera is measured by forming the mean value of the signals in complete images. This mean value is obtained in an identical manner by low pass filtering. By comparison with signals corresponding to equal energy white, it is possible to determine therefrom colour signals to modify an amplifier chain or adders until electrical signals are obtained which correspond to the equal energy white ($R-Y=B-Y=0$ or R, V, B in a ratio of 1). When this setting has been obtained, the camera is used normally for photographing or shooting a random scene, the setting being kept unchanged during this operation.

Thus, such a procedure does not supply a permanent correction process, because the setting is only made once and not corrected during the scene. Moreover, it assumes that a perfectly white screen is available, which is not always the case when shooting. Finally, this process is unable to correct an image having an inopportune colour cast, e.g. due to imperfect lighting.

The object of the invention is to obviate these disadvantages by proposing a system and a process which permits a permanent correction without using a reference screen. Moreover, the invention permits a large number of correction types and is no longer limited to adjusting just white.

These objectives are achieved by the following means:

(a) firstly, there is no need to use a reference screen (white or balanced), (b) due to processing of the actual image resulting from the photography, the image is analysed not by processing all the image signals, but only by taking certain samples corresponding to certain points of the image, (c) there is no low pass filtering of an image, (d) a digital mean calculation takes place on the samples taken and not on the complete image, which makes it possible to obtain an average colour for the scene being photographed (and not as in the prior art an average colour corresponding to a white screen), (e) correction coefficients are calculated on the basis of the average colour obtained and are defined as a function of various criteria which, when applied to the samples taken, give corrected samples, which define a corrected average colour;

(f) correction coefficients obtained from certain samples of the image are applied to all the signals supplied by the camera and which are consequently corrected;

(g) the calculation of the correction coefficients is reupdated or reactualized by taking new samples.

It is readily apparent that such a process is very advantageous. First, it is permanently adapted to the instant scene as a result of a reactualization, which can be carried out for each new image. A new set of samples is then taken into account for each image and a new average colour obtained. However, the reactualization can be performed every N images (N a random integer) or only when the average colour varies excessively from a reference value.

The process according to the invention is also completely automatic and requires no intervention on the part of the operator (manipulation of white screens, coloured filters, etc).

Finally, it has considerable flexibility. Thus, the samples used for determining the average colour can be chosen either by sampling several points per image, or by sampling a single point per image, or by modifying the position of the image point or points between individual images in a predetermined or random manner, or by sampling points on groups of consecutive or non-consecutive images, etc.

With regard to the actual correction, the invention once again provides considerable flexibility. Naturally, an attempt can be made to reach a reference colour, but it is also possible to make an approximation by reducing the variation between the average colour observed and the reference colour and, in exceptional circumstances, it is possible to increase this variation (single-colour images, special effect, etc). This large variety of corrections was not possible in the prior art due to the very principle used, which is based on the cancelling out of an error signal reflecting the variation between a measured value and a reference value. Thus, in the prior art, it is only possible to reach a reference value (in the circumstances white).

More specifically, the present invention relates to a permanent colour correction process applicable to a video camera, which produces primary signals able to characterize the colorimetric state of the image, processing of these signals being carried out in order to correct them, characterized in that it comprises during shooting, taking samples of signals relative to certain points of the images, storing in digital form a group of such samples relating to at least one image, digitally calculating the mean values of the samples stored, which defines an average colour, calculating correction coefficients on the basis of the average colour obtained and which, when applied to the samples, define a corrected average colour, applying to all the signals supplied by the camera for all the points of the images, the thus calculated correction coefficients which supplies corrected signals and reactualizing the calculation of the correction coefficients by reactualizing all the samples used for calculating said mean values.

The present invention also relates to a permanent colour correction system during the process defined hereinbefore, said system being associated with a video camera producing signals able to characterize the brightness and colour of this point, said system incorporating means for processing these signals and for determining therefrom a correction thereof, said system being characterized in that it comprises a digital processing member which, during shooting, is able to take samples of the signals relative to certain points of the images, storing in digital form a group of these samples relating to at least one image, digitally calculating the mean values of the stored samples which defines an average colour, digitally calculating correction coefficients on the basis of the average colour obtained, said correction coefficients when applied to the samples defining a corrected average colour, and able to reactualize the calculation of the correction coefficients by reactualizing all the samples used for calculating the mean values; a correction circuit with two inputs, one being connected to the output of the camera and the other connected to the processing member and receiving therefrom the correction coefficients, and with one input supplied corrected signals.

The characteristics of the invention will be better understood from the following description of explanatory and non-limitative embodiments with reference to the attached drawings, which show.

The process according to the invention deals in a random manner with the components of the primary colours, conventionally designated R (red), V (green), B (blue), the brightness and colour signals being designated by DR and DB in the PAL and SECAM system and Y, $E_I$, $E_Q$ in the NTSC system. It is pointed out that as R, V and B are three real primary colours of a trichromatic system, they are all positive or zero and that Y, DR and DB designate three virtual primary colours (i.e. not physically realizable in their totality), such that Y represents the brightness (i.e. the black and white image) and DR and DB the colour information, Y then being positive or zero and DB and DR having a random sign.

It is possible to pass from one system to the other by the following approximate formulas:

$$Y = 0.3R + 0.59V + 0.11B$$

$$DR = R - Y$$

$$DB = B - Y$$

or conversely:

$$R = Y + DR$$

$$V = T - \frac{0.3}{0.59} DR - \frac{0.11}{0.59} DB$$

$$B = Y + DB$$

For a black and white image, we obtain:

$$R = V = B = Y$$

and $$DR = DB = 0$$

In the same way, it is possible to pass from DR, DB to $E_Q$, $E_I$ by the relations:

$$E_Q = 0.48DR + 0.41DB$$

$$E_I = 0.74DR - 0.27DB$$

It is possible to pass from $E_I$, $E_Q$ to R, V, B or vice versa by relations:

$$E_Q = 0.21R - 0.52V + 0.31B$$

$$E_I = 0.39R - 0.67V + 0.28B$$

and $$R = Y + 0.62E_Q + 0.95E$$

$$V = Y - 0.53E_Q - 0.20E_I$$

$$B = Y + 1.72E_Q - 1.11E_I$$

Hereinafter, real or virtual primary colours will be used in general terms to designate any one of these representations, making it possible to characterize the colorimetric state of a point.

The first operation performed according to the invention is a mean value calculation, which can be an arithmetic or a weighted mean. If the mean operation is designated M, Ro=M(R), Vo=M(V), Bo=M(B) is calculated in the case when use is made of the primary colours; Yo=M(Y), DRo=M(DR), DBo=M(DB) in the case where use is made of differential signals; and Yo=M(Y), $E_{Qo}$=M($E_Q$), $E_{Io}$=M($E_I$) in the latter case.

These mean values are obtained by sampling in (or at the output of) the shooting camera the signals, R, V, B or Y, DR, DB or Y, $E_Q$, $E_I$ for several image points. Mean value calculations involve a digital processing device organised around a microprocessor. As a microprocessor is not generally fast enough to obtain in real time the mean value of the signals relating to all the points constituting an image, a sampling must be carried out by taking the signals relating to one or a few points in one or a few images and by calculating the mean value on one or more images. For example, it is possible to take the signals relating to one point per image and effect a mean value on 128 successive images. The chosen point in the image is preferably never the same and can be displaced step by step.

According to an advantageous variant, the coordinates of the sampled point vary in a pseudorandom manner, so as to distribute the chosen points over the entire extent of the images and so as not to give preference to any zone. The microprocessor must then produce a bidimensional pseudorandom sequence determining the coordinates of the point to be sampled. At each frame (or at each field), the microprocessor stores a new point, abandons the 129th oldest point and calculates new mean values on the most recent 128 points. All these points can be interpreted as forming a scatter diagram in a three-dimensional reference system R, V, B. The mean values of these points represent the coordinates of the centre of gravity of the scatter diagram and these questions will be considered in detail hereinafter.

Once the mean value is known, the appropriate correction coefficients can be calculated and transmitted to a correcting device. For example, these coefficients are calculated for each image or frame and are transmitted during the image or frame flybacks. The manner of calculating the correction coefficients is illustrated in FIGS. 1 to 5.

Figure 1:
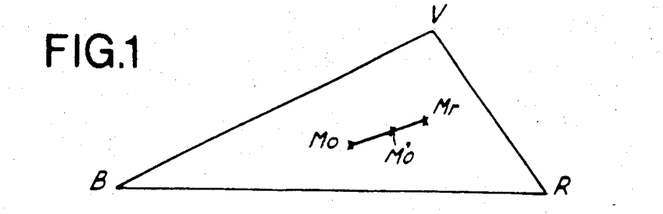
FIG. 1 a colour plan making it possible to locate the average colour obtained before and after correction.

FIG. 1 first shows a colour plan according to a conventional representation in which one point, represented by three coordinates R, V, B defines a particular colour. As represented, the plan corresponds to a constant brightness plan. Point Mo corresponds to the calculated mean values Ro, Vo and Bo and point Mr to a reference colour defined by its components Rr, Vr and Br. In general, this reference colour is grey for which the three components are equal. As R, V and B are linked by $Y=0.3R+0.59V+0.11B$, if $R=V=B$, we necessarily have $R=V=B=Y$. Thus, with a reference colour which is grey, the three reference components are equal to a same value, which is a reference brightness Yr.

In a first simple case, this reference brightness is taken as equal to the average brightness Yo of the sampled points. In other words, on correcting the amplitudes of the primary colours, the average brightness is retained (but not the brightness of each point, because the primary colours R, B and V are modified). In this case, the correction coefficients to be calculated are simply the quotients:

$$Yo/Ro, Yo/Vo, Yo/Bo \quad (1)$$

The correction to be made to the signals R, B and V of each image point (and not only the signals relating to the sampled points used for establishing the mean value), will then consist of multiplying these signals by these coefficients. The corrected signals R', V' and B' will be respectively equal to:

$$R' = \frac{Yo}{Ro} R, \ V' = \frac{Yo}{Vo} V, \ B' = \frac{Yo}{Bo} B \quad (2)$$

The mean values obtained by sampling these signals will all be equal to Yo.

On returning to FIG. 1, the algebraic correction performed is geometrically translated by a displacement of point Mo to Mr.

If the brightness Yo is not retained, but assumes a value Yr, the following coefficients result:

$$Yr/Ro, Yr/Vo, Yr/Bo \quad (3)$$

In even more general terms, if a coincidence is desired between point Mo and a reference point which does not necessarily represent the grey and for which the coordinates Rr, Vr and Br are consequently not necessarily equal to the same value Yr, the following coefficients will be formed:

$$Rr/Ro, Vr/Vo, Br/Bo \quad (4)$$

These relations allow as special cases relations (3) with $Rr=Vr=Br=Yr$ and relations (2) when $Yr=Yo$.

This first variant has a disadvantage when the image to be treated or processed has a uniform colour e.g. blue. In this case, the correction no longer consists of bringing about coincidence between point Mo and reference point Mr, but solely of reducing the variation between these two points. In FIG. 1, this means that Mo comes as M'o for the coordinates R'o, V'o and B'o located between Mo and Mr. Instead of using the coefficients defined by 1, use will be made of the following coefficients, in which a is a number between 0 and 1:

$$\frac{R'o}{Ro} = a + (1-a)\frac{Yo}{Ro}, \frac{V'o}{Vo} = \quad (5)$$

$$a + (1-a)\frac{Yo}{Vo}, \frac{B'o}{Bo} = a + (1-a)\frac{Yo}{Bo}$$

It can be seen that for $a=0$, relation (1) is obtained. If the average brightness is not kept at its value Yo, but instead assumes a new value Yr, Yo is replaced by Yr in relation (5).

In more general terms, the correction coefficients by which it is necessary to multiply R, V and B can be expressed by:

$$\frac{R'o}{Ro} = a + (1-a)\frac{Rr}{Ro}, \frac{V'o}{Vo} = \quad (6)$$

$$a + (1-a)\frac{Vr}{Vo}, \frac{B'o}{Bo} = a + (1-a)\frac{Br}{Bo}$$

Following the application of these correction coefficients, the mean values become:

$$R'o = aRo + (1-a)Rr$$

$$V'o = aVo + (1-a)Vr$$

$$B'o = aBo + (1-a)Br$$

For $a=0$, we then obtain relation (4) and with $Rr=Vr=Br=Yr$ relation (3) is obtained. Relation (1) is obtained for $a=0$ and $Yr=Yo$.

Experience has shown that a coefficient a close to ½ is completely suitable. The colour casts on the differently coloured images are eliminated and the uniformly coloured images are not converted into grey images.

According to an advantageous embodiment, the number a is not fixed and can instead be adjusted as a function of the image to be processed. For example, a can be varied between ¼ and 1, i.e. between a very high correction for $a=¼$ and a zero correction for $a=1$, as a function of the offcentering of the centre of gravity of the scatter diagram. The coordinates of the centre of gravity of the scatter diagram are Ro, Vo and Bo. The scatter diagram is "centered" if its centre of gravity coincides with the grey, i.e. if $Ro=Vo=Bo=Yo$. The offcentered character of the scatter diagram is measured relative to the ratio of the maximum of the triplet Ro, Vo, Bo to the minimum of said triplet (or in other words the largest coordinate with the smallest coordinate) and which is designated $r_o = \max(Ro, Vo, Bo)/\min(Ro, Vo, Bo)$, where the designation max ( ) represents the maximum of the quantity in brackets and in the same way min ( ) the minimum of the quantity in brackets. It is confirmed that $r_o=1$ for the grey and that $r_o$ increases on moving away from this reference. In the case where a colour cast is to be eliminated, $r_o$ remains low. In the case of a uniform saturated colour, $r_o$ again becomes very high. For ease of calculation reasons, $r_o$ is set at 256 and a is calculated in the following way: $a=¼$ $1/r_o + (1 - 1/r_o)$. Formulas (5) and (6) can be finally expressed as a function of $r_o$.

In the case of the application of the invention to visiophony, every effort is made to approach a point which is not pure grey, but a grey with a slight "flesh coloured" colour cast. This point can be defined with the aid of three parameters b, c and d by the coordinates:

$$\frac{Yr(1+b)}{1+0.3b+0.59c+0.11d}, \frac{Yr(1+c)}{1+0.3b+0.59c+0.11d}, \quad (7)$$

$$\frac{Yr(1+d)}{1+0.3b+0.59c+0.11d}$$

Figure 2:
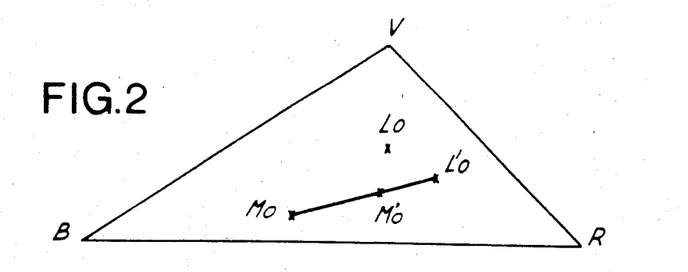
FIG. 2 a colour plan illustrating a particular correction.

In FIG. 2, point Lo corresponds to pure grey (Rr=Vr=Br=Yo) and point L'o to a grey with a flesh-coloured cast.

These coordinates are somewhat complicated, because it is necessary for the point L'o to be in the brightness plan. However, with b, c and d given, the three coordinates of L'o are defined once and for all as a function of Yr.

The correction coefficients making it possible to pass the average colour Mo to M'o between L'o and Mo are obtained by a relation identical to (5) in which Yo is respectively replaced by the aforementioned coordinate (7). On making b=c=d=o, the reference point is obtained which corresponds to the grey with a brightness Yr, which can be taken as equal to Yo.

Hereinbefore, it has been assumed that the processed signals were R, V and B. The colour correction then necessarily affects the brightness of each point, because it modifies R, V and B. However, the average brightness relating to all the sampled points can optionally remain constant. For various reasons, and mainly for questions of flicker and image coding necessitating a movement detector, it is possible not to modify the brightness Y or the current point of the image. In this case, the invention provides a processing which only relates to the differential signals DR and DB (containing the colour information) and not the brightness signal Y. If need be, it is naturally possible to modify the brightness, but this takes place in an independent manner after carrying out a colour correction with constant brightness.

In the case of processing signals DR, DB and Y, the mean values are in the form DRo, DBo and Yo and which are converted into Ro, Vo and Bo by the relations given hereinbefore. Having these mean values Ro, Vo and Bo, the aforementioned correction is carried out to give R'o, V'o and B'o. The corrected mean corrdinates R'o, V'o and B'o are then converted into differential signals respectively DR'o and DB'o by the relations: $DR'o=R'o-Y'o$, $DB'o=B'o-Y'o$ (where, in this case, $Y'o=Yo$).

Having calculated the mean values Yo, DRo and DBo of the sampled points, the two correction coefficients to be used are equal to DR'o—DRo and DB'o—DBo.

The correction thus consists of modifying the signals Y, DR and DB relative to each image point into signals Y'', DR'' and DB'' defined by:

$$Y''=Y, DR''=A(DR+DR'o-DRo), DB''=A(DB+DB'o-DBo) \quad (8)$$

in which A is a parameter, which can be fixed or adjustable as will be shown hereinafter. In the case of a total correction, point M'o coincides with the reference point Mr and we obtain R'o=Rr, B'o=Br and Y'o=Yr (in this case Y'o=Yo).

Figure 3:
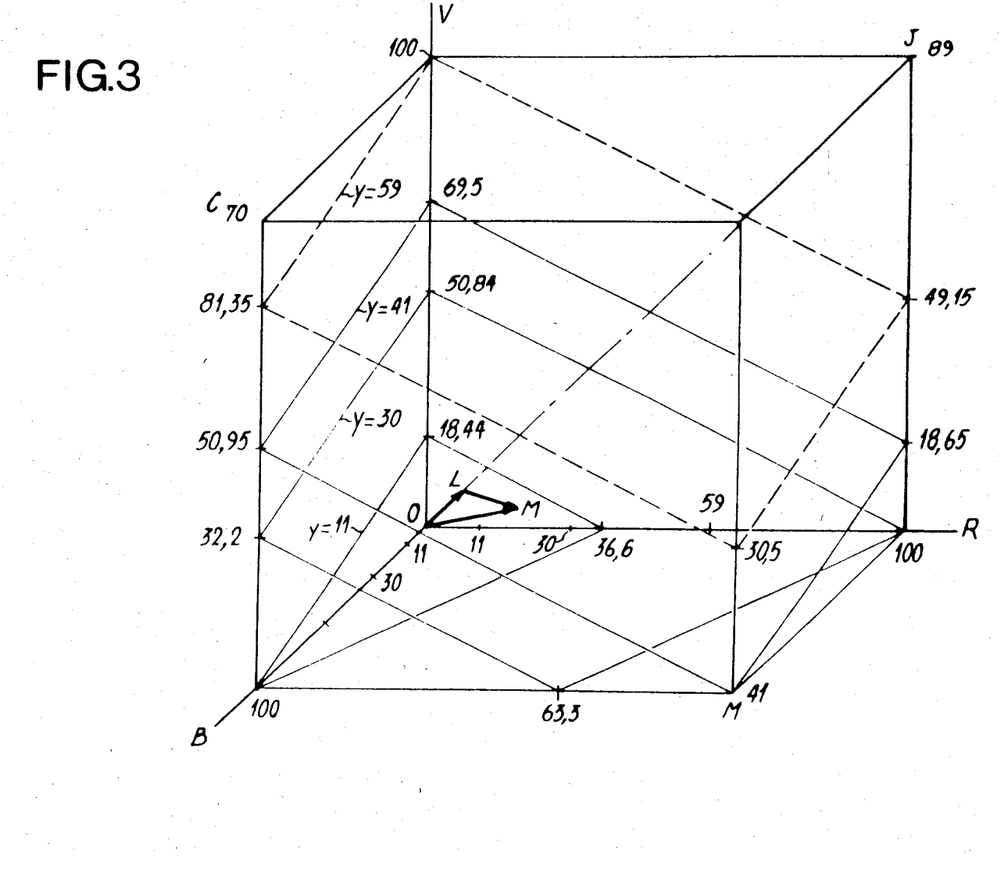
FIG. 3 a three-dimensional diagram illustrating a particular correction type in constant brightness plans.

In order to understand the principle of such a correction, it is necessary to refer to the trihedron of colours as shown in FIG. 3. The origin is designated O and the signals R, V and B are plotted on three orthogonal axes. All the points of a coloured image can be translated by a scatter diagram located within a cube of side 100. In such a cube, it is possible to define equal brightness plans. For example, in a scale where R, V, B and Y are measured from 0 to 100 one could have plan $Y=0.3R+0.59V+0.11B=11$, plan $Y=0.3R+0.59V+0.11B=30$, plan $Y=0.3R+0.59V+0.11B=41$, etc. These plans are shown in FIG. 3 and are parallel to one another. There is a special zero brightness plan ($Y=0.3R+0.59V+0.11B=0$) passing through the origin. In each cube is also plotted the diagonal OB representing the locus of the grey points.

It is possible to see that in such a reference, each point M of the coordinates (R, V, B) defines a vector $\overrightarrow{OM}$, which can be written $\overrightarrow{OM}=\overrightarrow{OL}+\overrightarrow{LM}$, L being the intersection point of the brightness plan $Y=0.3R+0.59V+0.11B$ passing through M, with the diagonal OB. This amounts to writing the coordinates of M respectively in form:

$$(Y)+(R-Y), (Y)+(v-Y), (Y)+(B-Y).$$

Figure 4:
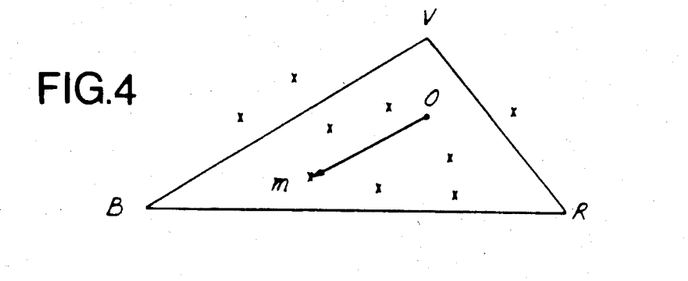
FIG. 4 a projection of the previous diagram on a constant brightness plan.

It can be seen that $\overrightarrow{LM}$ has as components R−Y, V−Y and B−Y. No longer considering the brightness of the points amounts to projecting, parallel to diagonal OB, the image of the points of the cube on the zero brightness plan. In the latter, points R, V and B are the apices of a triangle. The direction of vector $\overrightarrow{Om}$, the projection of $\overrightarrow{LM}$, represents the shade and its amplitude is linked with the saturation, as shown in FIG. 4. This scattered diagram has its centre Mo and its components are (Ro−Yo), (Vo−Yo), (Bo−Yo), i.e. DRo, DVo, DBo.

In the same way as in the aforementioned variant, it is wished that mo coincides with a reference point lo, which is the projection of a reference point Lo shown in the trihedron ORVB and which corresponds to pure grey (or a point L'o slightly differing from pure grey in the manner described hereinbefore).

Figure 5:
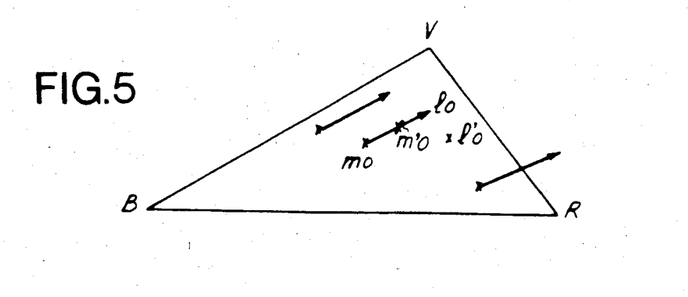
FIG. 5 a correction made in the constant brightness plan.

It is therefore necessary to define correction coefficients such that the mean point mo becomes lo (or l'o). As the grey point Lo projects on lo on the zero brightness plan, the correction will have the effect of transferring point mo to lo. In other words, the correction amounts to transferring the scatter diagram according to a vector $\overrightarrow{molo}$, in such a way that the mean point coincides with lo, which is shown in FIG. 5. In the case where the correction is partial, it passes point mo to m'o, hence the aforementioned correction with DR+(DR'o−DRo) and DB+(DB'o−DBo).

The parameter A used in the relations (8) is used for modifying the saturation of the image. This question will be described in detail to provide a better understanding of the adjustment principle of this parameter. Coefficient A of formulas (8) is linked with the saturation of the colours in the image. Thus, if A=0, we obtain DR'=DB'=0 and the image is in black and white. The saturation of a shade is linked with the relationship of two quantities, the grey variation and the grey "quantity" having said shade. The grey quantity of a colour characterized by R, V, and B is equal to min (R,V,B) in which min ( ) means, as hereinbefore, the smallest of the three quantities in brackets. The grey variation is max (R, V, B)-min (R, V, B) in which max ( ) designates the largest of the quantities in brackets. However, as it is an essential subjective notion, it is necessary to consider not the electrical quantities R, V and B, but the corresponding brightnesses $L_R=kR^\gamma$, $L_V=kV^\gamma$ and $L_B=kB^\gamma$ in which $\gamma$ is the "gamma" coefficient of the colour tubes ($\gamma=2.8$) and k is a coefficient making it possible to adapt the units. Thus, for the saturation definition, the quantity s is taken equal to:

$$1 - \frac{1}{\left[\frac{max(R,V,B)}{min(R,V,B)}\right]}$$

Hereinafter, the quantity $$\left[\frac{max(R,V,B)}{min(R,V,B)}\right]$$

applies to S. It is pointed out that min(R,V,B), the grey quantity of a colour, differs from the brightness $Y=0.3R+0.59V+0.11B$ and that $min(R,V,B) \leq Y \leq max(R,V,B)$. Thus, if B=min(R,V,B) for example and R=max(R,V,B), we obtain $DR=R-Y\geq 0$ and $DB=B-Y\leq 0$ so that after multiplication by A, $DR^*=ADR$ and $DB=ADB$, depending on whether A is higher or lower than 1, we obtain: with $A>1+DR^*=ADR>DR>0$ $DB^*=ADB<DB<0$ and $$R^* = Y + DR^* > R = Y + DB^* < B \text{ thus}$$

$$\frac{R^*}{B^*} = \frac{max(R^*, V^*, B^*)}{min(R^*, V^*, B^*)} > \frac{R}{B} = \frac{max(R,V,B)}{min(R,V,B)}$$

Thus, with $A>1$, the saturation is increased with $A < 1 \; R^* < R \; B^* > B^*$ and $$\frac{R^*}{B^*} = \frac{max(R^*, V^*, B^*)}{min(R^*, V^*, B^*)} < \frac{R}{B} = \frac{max(R,V,B)}{min(R,V,B)}$$

Thus, with $A<1$ the saturation is decreased. Thus, for each sampling point, the quantity S is calculated and then the mean value So of S is defined by the operation defined hereinbefore. An attempt is made to impose a constant mean saturation on each image, i.e. it is wished to obtain the same colour quantity for the images, but proportional to their average brightness Yo (if an image is dark, less colour is required and if an image is very pale, more colour is required). Thus, the procedure is such that the mean saturation So comes close to a standard value, i.e. mYo (m being a parameter which is either fixed once and for all, or which can be modified). Thus, So becomes S'o, e.g. by a linear law of type $S'o = Soy+(1-y)mYo$, in which y is a number which will be defined hereinafter. The following is then taken:

$$A = \left(\frac{S'o}{So}\right)^{1/2.8} = \left[y + (1-y)m\frac{Yo}{So}\right]^{1/2.8}$$

It is proved that if $So<mYo$, we obtain $So<S'o<mYo$ and $A>1$ and if $So<mYo$, we obtain $So<S'o<mYo$ and $A>1$.

Moreover, the coefficient A can be set and it is possible to impose $A<2$. The formulas (8) then becoming:

$$DR'' = \left(\frac{S'o}{So}\right)^{1/2.8} \times (DR + DR'o - DR_O), \quad (8')$$

$$DB'' = \left(\frac{S'o}{So}\right)^{1/2.8} \times (DB + DB'o - DB_O)$$

It is then necessary to determine y in the linear formula $S'o=Soy+(1-y)mYo$. Experience shows that $y=\frac{1}{2}$ is suitable for all coloured images, but is not suitable for almost black and white images (in this case So=1, mYo can be very large and S'o is consequently very large and it is therefore necessary to increase without reason signals close to zero, which can be dangerous. Thus, y is made to vary between $\frac{1}{4}$ and 1 (for $y=\frac{1}{4}$ there is a high correction and for y=1 a zero correction) as a function of the actual saturation So, by the relation $y=1.1/So+(1-1/So)\frac{1}{4}$, S being set at 256. By eliminating y, we obtain:

$$A = \left(\frac{S'o}{So}\right)^{\frac{1}{2.8}} \left[\frac{1}{So} + \left(1 - \frac{1}{So}\right)\frac{1}{4} + \left(1 - \frac{1}{So}\right)\frac{3}{4} m\frac{Yo}{So}\right]^{\frac{1}{2.8}}$$

The calculation of the saturation can take place on an image corrected for the first time in which A=1.

The principles described hereinbefore in the case of using signals R, V, B or signals Y, DR, DB are transposable to the case where signals Y, $E_Q$ and $E_I$ are used. The mean values $E_{Io}$, $E_{Qo}$ and Yo are then used and are converted into Ro, Vo and Bo by the relations given hereinbefore. With these mean values Ro, Vo and Bo, the aforementioned correction is performed and R'o, V'o and B'o are obtained making it possible to obtain signals $E'_{Io}$, $E'_{Qo}$ by formulas giving $E_I$ and $E_Q$ as a function of R, V, B, giving a correction defined by:

$$Y''=Y, E''_Q=A(E_Q+E'_{Qo}-E_{Qo}), E''_I=A(E_I+E'_{Io}-E_{Io}) \quad (8'').$$

Figure 6:
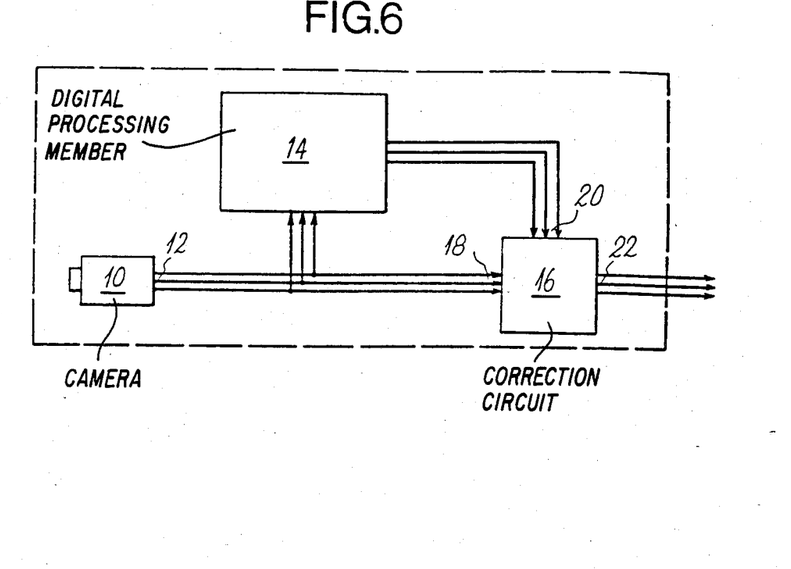
FIG. 6 a general diagram of a camera according to the invention.

Following this description of the process according to the invention, FIG. 6 shows a system using such a process. This system comprises a camera 10 with a different type of output (video, digital, composite or the like) and a digital processing member 14 connected to the output 10. The function of the member is to take samples of the signals relating to certain points of the image, to calculate the mean values of these samples, to define reference values and to calculate correction coefficients on the basis of the mean values obtained and the reference values. The represented system also comprises a correction circuit 16 with two outputs, one 18 receiving the signal supplied by the camera and the other 20 receiving the correction coefficient supplied by member 14. Circuit 16 also has an output 22 supplying corrected signals.

Naturally, it is not necessary to sample the signals following the output 12 of camera 10. In certain cases, it is possible to take samples directly in camera 10.

The first task of member 14 is to sample the video signals, i.e. to sample a group of three signals (R, V, B or Y, DR, DB) from among the signals supplied, the point corresponding to these samples having to move in a random manner through the image. The microprocessor contained in the processing member carries out this first task using a sequence of numbers called a 2-equipart sequence.

The theory of pseudorandom functions based on the notion of the equipart sequence indicates the the sequence $n = Fr(\alpha n^2)$, in which n is an integer and in which the notation FR ( ) signifies "fractional part of the number in brackets" is 2-equipart (in the unit square of the plan), if $\alpha$ is irrational. The term "2-equipart" signifies that for the sequence $u_n$, $u_{n+1}$, $u_{n+2}$ ... $u_{n+p}$, the points of the plan of coordinates $(u_n, u_{n+1})$, $(u_{n+1}, u_{n+2})$ ... $(u_{n+p}, u_{n+p+1})$ ... are equally distributed in the square of sides 1.

As in informatics, irrational numbers do not exist, a rational number equal to p/q is used for $\alpha$, which is then the irreducible representation of the number $\alpha$. In this case, the sequence $u_n$ becomes periodic of period q. With a microprocessor working on 8 bit words extensible to 16 for arithmetic operations, the largest number possible is chosen for q, i.e. $q = 2^{16} - 1$. Bearing in mind that one term $u_n$ per frame is used, if the image is broken down into frames (e.g. two optionally interlaced frames), this leads to a repetition period of approximately 20 minute, which is adequate for a visiophony application.

In an application especially investigated by the Applicant, the stored image is in the form of a rectangle of approximately 600 visible lines of 600 points each and each frame consists of 300 lines. In this frame is defined a zone of 265 points on 265 lines, which acts as the unit square defined hereinbefore. The sequence $u_n$ is then $$u_n = E\left[256\, Fr\left(\frac{p}{q} n^2\right)\right]$$

in which E[ ] designates the whole part of the number in square brackets.

Thus, the microprocessor performs the following operations:
  reading the content of an internal register in which n is stored,
  multiplication of n by n,
  multiplication of $n^2$ by p,
  division of $pn^2$ by q,
  abandoning the whole part of $(p/q)n^2$ (thus retaining the fractional part $Fr([p/q]n^2)$,
  multiplication of $Fr([p/q]n^2)$ by 256,
  abandoning the fractional part of $256 \times Fr([p/q]n^2)$,
  increasing by 1 of the register containing n, etc.

The register content n can be made equal to zero on starting up. The above program is carried out at the start of each frame. The calculation time is less than the duration of a frame and two successive results are kept in a memory. These two results, which are addresses, are transmitted at the start of each frame to two comparators. Two counters permanently supply the horizontal and vertical address of the current point to these two comparators. When coincidence exists with the calculated addresses, the current point is provisionally stored in an input-output memory of the microprocessor and is then transferred into an internal memory.

The sampled current point is translated by three 8 bit words (R, V, B or Y, DR, DB or Y, $E_I$, $E_Q$). The memory zone reserved for calculating the mean value is located in the internal memory and is organised into three circulating tables of length e.g. 128, which means that the 129th word is written in place of the first, the 130th in place of the second, etc. These tables permanently contain the signals corresponding to the 128 last points sampled.

The calculation of the average colour is obtained for each frame by obtaining the mean of the contents of the three tables. In the case of an arithmetic mean, the sum of the contents of the three tables is obtained and then this result is divided by 128. However, it is also possible to form a weighted mean. The mean signals Ro, Vo, Bo and Yo, DRo, DBo and Yo, $E_{Io}$, $E_{Qo}$ are thus permanently reactualized.

The aforementioned formulas, which define the coefficients, reveal the parameters a, b, c and d. If they are definitively fixed, they are introduced into the general program of the processing member 14. If it is necessary to adjust them, manual operating buttons make it possible to introduce them into the processing member.

An example for the calculation of the correction coefficients is now given, namely for calculating the coefficient $$aRo + (1-a)Yo\frac{1+b}{1+0.3b+0.59c+0.11d}.$$

The quantity $$Q = \frac{1+b}{1+0.3b+0.59c+0.11D}$$

is calculated once and for all at the start of a sequence and is not recalculated for each frame. This quantity can be fed in completely calculated form into the program. Moreover, the quantity $aRo+(1-a)YoQ$ is recalculated for each frame, because Ro and Yo change on each occasion. Thus, this requires three multiplications and one addition, which is particularly simple for a microprocessor.

Figure 7:
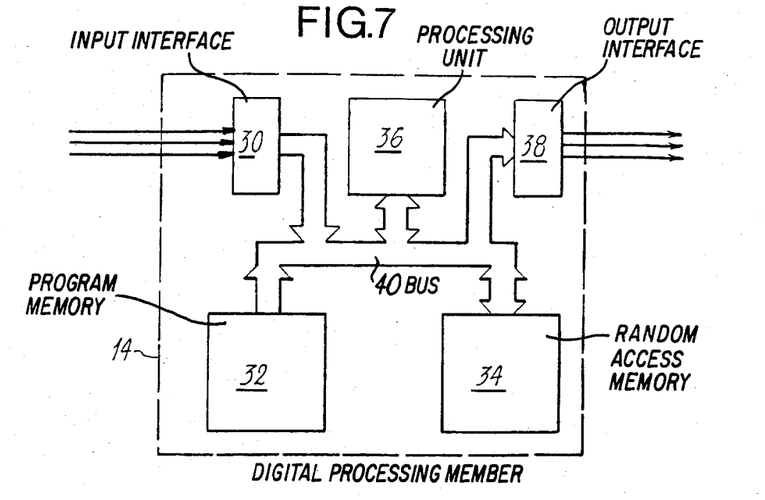
FIG. 7 the structure of a digital processing member usable in the invention.

FIG. 7 illustrates the functional diagram of a processing member, as defined hereinbefore. It comprises an input interface 30, a program memory 32 (type ROM or PROM), a random-access memory 34 (RAM), which is used for storing the three tables R, V, B or Y, DR, DB or Y, $E_I$, $E_Q$, as well as the calculation results, a processing unit 36 containing sampling means, computing means and an arithmetic unit (able to perform the elementary operations of addition, subtraction, multiplication, division, displacement to the right, displacement to the left, Fr ( ) and E ( ) defined hereinbefore), an output interface 38 and finally a bus 40 connecting together these different units.

Figure 8:
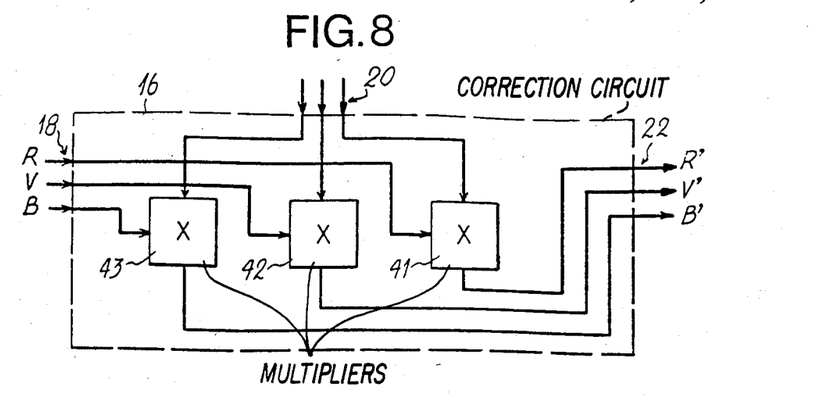
FIG. 8 a first embodiment of a correction circuit.
Figure 9:
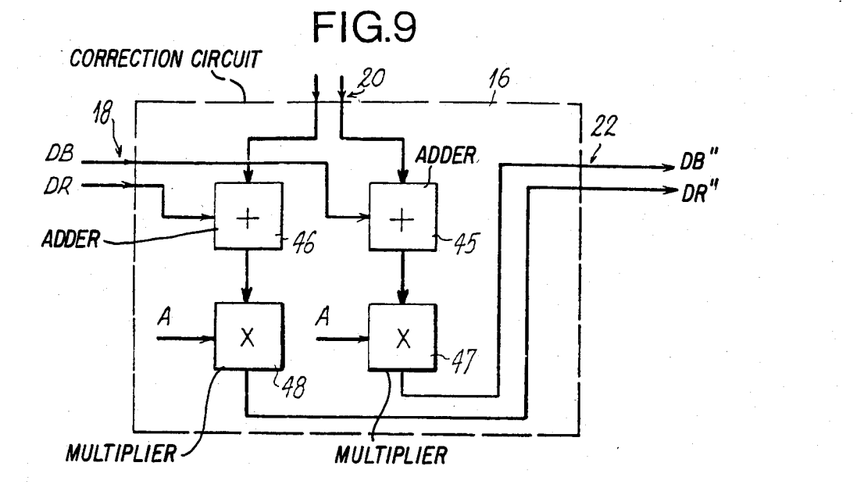
FIG. 9 a second embodiment of a correction circuit.

FIGS. 8 and 9 illustrate the structure of the correction circuit in the three cases envisaged hereinbefore of correcting signals R, V, B, Y, DB, DR or Y, $E_I$, $E_Q$. In the first case, the circuit comprises three multipliers 41, 42, 43 (digital or analog) allocated respectively to the correction of signals R, V, B and supplying corrected signals R', V', B'. In the second and third cases, this circuit comprises two adders 45, 46 (analog or digital) followed by two multipliers by A, i.e. 47 and 48, the assembly performing the two last operations of relations (8) and (8'').

Figure 10:
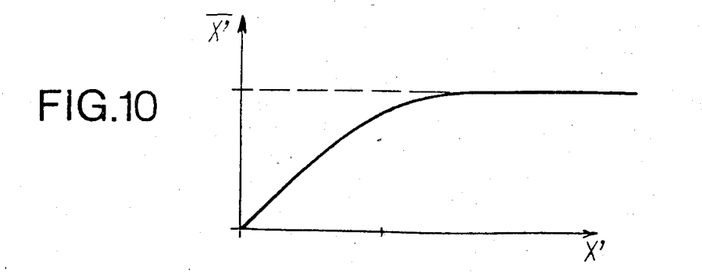
FIG. 10 a clipping function.

In these two correction circuit types, there are clipping circuits for limiting the amplitude of the output signals. FIG. 10 shows a possible characteristic for such a clipper which transforms a random signal X' (in practice R', V', B' or DB'', DR'') into a clip signal $\overline{X}'$. In the illustrated case, the clipper is progressive.

If the signal X' is not positive, as for DB, DR, $E_I$, $E_Q$, FIG. 10 represents the clipping function of the positive part. It is obviously necessary to clip the negative part by a symmetrical clipper (with respect to the origin).

I claim:

1. Permanent colour correction process applicable to a video camera which produces primary signals able to characterize the colorimetric state of images constituted by points said process consisting in, during shooting, taking samples of signals relative to certain points of the images, storing in digital form a group of such samples relating to at least one image, digitally calculating the mean values of the samples stored, which defines an average colour, calculating correction coefficients on the basis of the average colour obtained and on a basis of a reference colour and which, when applied to the samples, define a corrected average colour, applying to all the signals supplied by the camera for all the points of the images, the thus calculated correction coefficients which supplies corrected signals and updating the calculation of the correction coefficients by using new samples corresponding to new images.

2. Process according to claim 1, characterized in that for calculating the mean values in question, the signals relating to several points of each image are sampled.

3. Process according to claim 1, characterized in that one point of each image is sampled, said point having a position changing in random manner from image to image.

4. Process according to claim 2, characterized in that the mean values are calculated for each new image, whilst always taking into account a same number of points.

5. Process according to claim 2, characterized in that each frame is constituted by two fields and that one point of each field is sampled.

6. Process according to claim 1 in which the camera uses, for translating the brightness and colour of each image point, three signals of primary colours R, V, B wherein the mean values Ro, Vo, Bo of the corresponding signals are calculated for the samples taken, a reference colour is defined whose primary components are Rr, Vr, Br, correction coefficients $$a + (1-a)\frac{Rr}{Ro}, a + (1-a)\frac{Vr}{Vo}, \text{ and } a + (1-a)\frac{Br}{Bo}$$

are defined in such a way that when applied to the samples the mean values of the samples assume the corrected value R'o, V'o, B'o defined by:

R'o=aRo+(1−a)Rr

V'o=aVo+(1−a)Rv

B'o=aBo+(1−a)Br in which a is a coefficient between 0 and 1 and applying to all the signals supplied by the camera for all the points of the image the thus calculated correction coefficients, which supplies corrected signals.

7. Process according to claim 6, characterized in that coefficient a can be adjusted.

8. Process according to claim 7, characterized in that the ratio ($r_o$) between the largest of the mean values Ro, Vo, Bo and the smallest of these means values is determined and the coefficient a is determined on the basis of $r_o$ by a predetermined relationship.

9. Process according to claim 8, characterized in that the relation linking a to $r_o$ is:

$$a = \frac{1}{4}\frac{1}{r_o} + \left(1 - \frac{1}{r_o}\right).$$

10. Process according to claim 6, characterized in that the components Rr, Vr, Br of the reference colour are equal to:

$$\frac{Yr(1+b)}{1+0.3b+0.59c+0.11d} \quad \frac{Yr(1+c)}{1+0.3b+0.59c+0.11d} \quad \frac{Yr(1+d)}{1+0.3b+0.59c+0.11d}$$

in which, b, c, d are fixed parameters.

11. Process according to claim 1, in which the camera uses, for translating the brightness and colour of each image point, a signal Y directly translating said brightness and two differential signals DR, DB containing all the colour information, characterized in that the mean values of these differential signals DRo and DBo are calculated, on the basis of the mean values DRo and DBo are calculated the corresponding mean values Ro, Vo, Bo, correction coefficients $$a + (1-a)\frac{Rr}{Ro}, a + (1-a)\frac{Vr}{Vo} \text{ and } a + (1-a)\frac{Br}{Bo}$$

are computed wherein a is a coefficient between 0 and 1, these correction coefficients are applied to the samples so as to obtain corrected mean values R'o, V'o, B'o, equal to aRo+(1−a) Rr, aVo+(1−a) Vr, and aBo+(1−a) Br from which are computed the corrected mean signals DR'o and DB'o and the following correction is made:

$$A(DR+Dr'o-DRo), A(DB+DB'o-DBo)$$

in which A is a parameter, the brightness Y of each point not being modified.

12. Process according to claim 1, in which the camera uses, for translating the brightness and colour of each image point, a signal Y directly translating said brightness and two signals $E_I$, $E_Q$ containing all the colour information, characterized in that the mean values of these signals $E_{Io}$ and $E_{Qo}$ are calculated, reference mean values $E_{Ir}$, $E_{Qr}$ are defined, on the basis of the mean values $E_{Io}$ and $E_{Qo}$ are calculated the corresponding means values Ro, Vo, Bo, correction coefficients are defined to obtain corrected mean values R'o, V'o, B'o and from said corrected mean values are obtained corrected mean signals $E'_{Io}$, $E'_{Qo}$ followed by performing the correction:

$$A(E_I+E'_{Io}-E_{Io}), A(E_Q+E'_{Qo}-E_{Qo})$$

in which A is a parameter, the brightness Y of each point not being retained.

13. Process according to either of the claims 11 and 12, characterized in that for each sample is calculated a parameter S equal to the relationship between the largest of the signals R, V, B and the smallest thereof, which rises to the power 2.8, followed by the calculation of the mean So of S, which defines a mean saturation, a standard saturation is defined and the image is corrected so that the mean saturation So is close to the standard saturation and becomes S'o, the coefficient A being taken equal to $(S'o/So)^{1/2.8}$.

14. Process according to claim 13, characterized in that a standard saturation equal to mYo is defined in which m is a predetermined parameter and Yo is the average brightness and the corrected saturation S'o is calculated by the relation $S'o = Soy + (1-y)mYo$, in which y is the number at least equal to 1.

15. Process according to claim 14, characterized in that the number Y is adjustable.

16. Process according to claim 15, characterized in that the number Y is defined by the relation:

$$y = 1/So + (1 - 1/So)^{\frac{1}{4}}$$

17. Process according to claim 1, characterized in that the mean value in question is an arithmetic mean.

18. Process according to claim 1, characterized in that the mean value in question is a weighted mean.

19. Process according to claim 1, characterized in that the corrected signals are clipped.

20. Permanent colour correction system associated with a video camera (10) producing signals able to characterize the brightness and colour of images constituted by points, said system comprising a digital processing member (14) which, during shooting, is able to take samples of the signals relative to certain points of the images, to store in digital form a group of these samples relating to at least one image, to digitally calculate the mean values of the stored samples which defines an average colour, to digitally calculate correction coefficients on the basis of the average colour obtained, said correction coefficients when applied to the samples defining a corrected average colour, and able to update the calculation of the correction coefficients; said system further comprising a correction circuit (16) with two inputs, one (18) being connected to the output of the camera (10) and receiving therefrom uncorrected signals and the other (20) connected to the processing member (14) and receiving therefrom the correction coefficients, and with one output (22) supplying corrected signals.

21. System according to claim 20, in which the signals used by the camera are three signals of primary colours R, V, B, characterized in that the digital processing member (14) calculates and derives multiplicative correction coefficients and that the correction circuit comprises three digital multipliers (41, 42, 43), each receiving one of the three primary colour signals and the corresponding correction coefficient.

22. System according to claim 20, in which the signals used by the camera are a signal Y directly translating the brightness of the point and differential signals DR, DB or signals $E_I$, $E_Q$ containing all the colour information, characterized in that the digital processing member (14) calculates and supplies additive correction coefficients and that the correction circuit comprises two digital adders (45, 46) receiving the differential signals and the corresponding correction coefficients and two multipliers (47, 48) connected to the two adders.

* * * * *